(12) United States Patent
Lee et al.

(10) Patent No.: US 12,352,611 B2
(45) Date of Patent: Jul. 8, 2025

(54) POTASSIUM NITRATE LEVEL DETECTION SENSING MODULE IN STRENGTHENING FURNACE

(71) Applicant: DOWOOINSYS CO., LTD., Cheongju-si (KR)

(72) Inventors: Hyung Sup Lee, Yongin-si (KR); Yun Hoe Kim, Cheongju-si (KR); Hyun Min Kim, Cheongju-si (KR); Hyun Yeol Yoon, Cheongju-si (KR)

(73) Assignee: DOWOOINSYS CO., LTD., Cheongju-si (KR)

( * ) Notice: Subject to any disclaimer, the term of this patent is extended or adjusted under 35 U.S.C. 154(b) by 189 days.

(21) Appl. No.: 18/039,412

(22) PCT Filed: Jan. 20, 2022

(86) PCT No.: PCT/KR2022/001036
§ 371 (c)(1),
(2) Date: May 30, 2023

(87) PCT Pub. No.: WO2022/191417
PCT Pub. Date: Sep. 15, 2022

(65) Prior Publication Data
US 2024/0133728 A1    Apr. 25, 2024
US 2024/0230391 A9    Jul. 11, 2024

(30) Foreign Application Priority Data
Mar. 11, 2021  (KR) .................. 10-2021-0031830

(51) Int. Cl.
*G01F 23/24* (2006.01)
*C03B 27/03* (2006.01)
*G01F 23/80* (2022.01)

(52) U.S. Cl.
CPC .............. *G01F 23/24* (2013.01); *C03B 27/03* (2013.01); *G01F 23/241* (2013.01); *G01F 23/243* (2013.01); *G01F 23/80* (2022.01)

(58) Field of Classification Search
CPC .............. C03B 27/03; G01F 23/24–248; G01F 23/80–808
See application file for complete search history.

(56) References Cited

U.S. PATENT DOCUMENTS

| 5,228,340 A * | 7/1993 | Kataoka ................ G01F 23/246 702/55 |
| 10,760,460 B1 * | 9/2020 | Rollinger .............. G01F 23/246 |
| 2006/0042375 A1 * | 3/2006 | Davis .................... G01F 23/247 73/295 |

FOREIGN PATENT DOCUMENTS

| JP | 2008309762 A | 12/2008 |
| KR | 100212401 B1 | 8/1999 |

(Continued)

OTHER PUBLICATIONS

International search report of PCT/KR2022/001036, May 17, 2022, English translation.

*Primary Examiner* — Justin N Olamit
(74) *Attorney, Agent, or Firm* — STIP Law Group, LLC (57) ABSTRACT

A potassium nitrate level detection sensing module M in a strengthening furnace according to the present invention includes a level detection means, which is installed inside a glass strengthening furnace, installed at a height equal to a level line of strengthening liquid to be filled in the strengthening furnace F, and generates an electrical signal having a set threshold or more or an electrical signal having the set threshold or less when it comes into contact with the strengthening liquid and detects that the strengthening liquid filled in the glass strengthening furnace F has reached a set strengthening liquid level line. The potassium nitrate level (Continued)

detection sensing module in the strengthening furnace according to the present invention having such a configuration can automatically identify that potassium nitrate in a liquid state, which is melted in the strengthening furnace, has reached the set level line in the strengthening furnace.

2 Claims, 9 Drawing Sheets

(56) References Cited

FOREIGN PATENT DOCUMENTS

| | | |
|---|---|---|
| KR | 20020080564 A | 10/2002 |
| KR | 20030081035 A | 10/2003 |
| KR | 100561175 B1 | 3/2006 |
| KR | 20120101964 A | 9/2012 |
| KR | 20190138506 A | 12/2019 |

* cited by examiner

POTASSIUM NITRATE LEVEL DETECTION SENSING MODULE IN STRENGTHENING FURNACE

CROSS-REFERENCE TO RELATED APPLICATIONS

This application is the U.S. National Phase under 35 U.S.C. § 371 of International Application No. PCT/KR2022/001036, filed on Jan. 20, 2022, which in turn claims the benefit of Korean Application No. 10-2021-0031830, filed on Mar. 11, 2021, the disclosures of which are incorporated by reference into the present application.

TECHNICAL FIELD

The present invention relates to a potassium nitrate level detection sensing module in a strengthening furnace, and, more particularly to a potassium nitrate level detection sensing module in a strengthening furnace that can automatically detect that potassium nitrate in a liquid state, which is glass strengthening liquid, has reached a set level line in the strengthening furnace.

BACKGROUND ART

Generally, glass strengthening is largely divided into physical strengthening and chemical strengthening.

The physical strengthening is a method of strengthening the internal strength of glass by heating glass having a thickness of 5 mm or more to a temperature between 550° C. and 700° C. and then rapidly cooling it, and is mainly used in the manufacture of strengthened glass doors and glass for automobiles.

However, the physical strengthening has a disadvantage that the physical strengthening is not applicable to thin glass, in which a temperature difference between a glass surface layer and a central layer thereof is not sufficient, strengthening is not realized in the case of small glass having a low coefficient of thermal expansion, and each part does not have a uniform temperature difference in the case of glass having a complex shape, and, since the physical strengthening is performed at a relatively high temperature (near the softening temperature), deformation may occur.

On the other hand, the chemical strengthening is to strengthen glass by immersing thin glass in a strengthening furnace containing a potassium nitrate solution at 450° C. for more than 3 hours to replace sodium ions contained in the glass with potassium ions of the potassium nitrate solution, and is mainly used to strengthen thin glass of 2.0 mm or less.

The chemical strengthening method is a method of strengthening glass by forming a compressive stress layer on a surface of glass and strengthening the glass by heating glass to be strengthened below the transition temperature in a range of 300° C. to 450° C., and on the other hand, melting potassium nitrate salt at the temperature of 380° C. or higher, and immersing the preheated glass in the molten salt and maintaining it for a certain period of time or longer.

Meanwhile, in order to check a level of liquefied potassium nitrate in the strengthening furnace, an ultrasonic sensor or a floating sensor can be used. In this case, in the case of the ultrasonic sensor, there was a problem that it could not be used at a high temperature of 200 degrees or higher, and in the case of the floating sensor, there was a problem that the floating sensor is fixed by potassium nitrate and thus the level cannot be measured.

On the other hand, as the prior art of the present invention, a multi-stage water level sensor of application number "10-2003-0081035" has been applied for and registered. The multi-stage water level sensor is a multi-stage water level sensor that detects a water level in a water tank and outputs the detection to a water supply device, and includes a body coupled to the water tank, a plurality of electrode rods having different lengths installed so as to hang down on a lower surface of the body, an insulator installed to surround the electrode rod at an upper portion of the electrode rod, which is a portion connected to the lower surface of the body, a comparator, and a signal output unit. The comparator receives capacitance values due to the electrode rod and water in the tank, respectively, and compares the capacitance values, the signal output unit includes a signal unit for receiving a signal from the comparator and outputting a signal indicating which electrode among the electrodes touches water to the water supply device, the longest one of the electrode rods is ground, and the signal unit is built into the body.

PRIOR ART LITERATURE

Patent Document

Patent Document 1: Republic of Korea Registered Patent Publication No. "10-0561175" (2006 Mar. 15)

DISCLOSURE OF THE INVENTION

Technical Problem

Therefore, in order to solve the above problem, the present invention is to provide a potassium nitrate level detection sensing module in a strengthening furnace that can automatically identify that potassium nitrate in a liquid state, which is melted in the strengthening furnace, has reached a set level line in the strengthening furnace.

In addition, another object of the present invention is to provide a potassium nitrate level detection sensing module in a strengthening furnace that can strengthen glass with an appropriate amount of potassium nitrate by automatically identifying that potassium nitrate in a liquid state melted in the strengthening furnace has reached the set level line in the strengthening furnace.

In addition, still another object of the present invention is to provide a potassium nitrate level detection sensing module in a strengthening furnace that can reduce the time and waste of manpower consumed in adjusting the potassium nitrate level in the strengthening furnace and automate a glass strengthening process by automatically identifying that potassium nitrate in a liquid state melted in the strengthening furnace has reached the set level line in the strengthening furnace.

Technical Solution

A potassium nitrate level detection sensing module M in a strengthening furnace according to the present invention for achieving the above object, as a first embodiment, includes a level detection means C, which is installed inside a glass strengthening furnace F, installed at a height equal to a level line of strengthening liquid to be filled in the strengthening furnace F, and generates an electrical signal having a set threshold or more or an electrical signal having the set threshold or less when it comes into contact with the strengthening liquid and detects that the strengthening liquid filled in the glass strengthening furnace F has reached a set strengthening liquid level line. In addition, the level detection means C, as the first embodiment, is a temperature sensing module 100 which is installed at a height equal to the level line of the strengthening liquid to be filled in the strengthening furnace F and detects the temperature, and the level detection sensing module M detects that the strengthening liquid filled in the strengthening furnace F has reached the set strengthening liquid level line if the temperature detected using the temperature sensing module 100 is 330 degrees or more. The level detection sensing module M, as the first embodiment, further includes a first signal processing unit 101 that adjusts an output voltage range output from the temperature sensing module 100 within an input voltage range of an input terminal provided in a first A/D converter 102, the first A/D converter 102 that converts an analog voltage output from the first signal processing unit 101 into digital data, a temperature conversion unit 103 that converts the digital data output from the first A/D converter 102 into a temperature value of the strengthening liquid, and a level reaching determination unit 104 that determines that the strengthening liquid filled in the strengthening furnace F has reached the set strengthening liquid level line when a temperature value of the strengthening liquid converted by the temperature conversion unit 103 is 330 degrees or more.

In addition, a potassium nitrate level detection sensing module M in a strengthening furnace according to the present invention, as a second embodiment, includes a level detection means C, which is installed inside a glass strengthening furnace F, installed at a height equal to a level line of strengthening liquid to be filled in the strengthening furnace F, and generates an electrical signal having a set threshold or more or an electrical signal having the set threshold or less when it comes into contact with the strengthening liquid and detects that the strengthening liquid filled in the glass strengthening furnace F has reached the set strengthening liquid level line. The strengthening furnace F is a conductor, and the level detection means C includes a measurement bar 200 for level detection that is installed at a height equal to the level of the strengthening liquid to be filled in the strengthening furnace F and is made of a conductor, and a resistance measurement module 201 that measures a resistance value between the measurement bar 200 for level detection and the strengthening furnace F. The level detection sensing module M determines that the strengthening liquid filled in the strengthening furnace F has reached the set strengthening liquid level line if the resistance value between the measurement bar 200 for level detection and the strengthening furnace F detected by the resistance measurement module 201 is within 0.1 ohm to 100 ohm. The resistance measurement module 201 includes a constant current supply unit 202 that supplies a constant current to the measurement bar 200 for level detection, a constant current measurement unit 203 that measures a constant current value, which is input from the constant current supply unit 202 to the measurement bar 200 for level detection, in real time, a voltage measurement unit 204 for voltage difference detection that measures a voltage difference between the measurement bar 200 for level detection and the strengthening furnace F, and a resistance measurement unit 205 that measures resistance between the measurement bar 200 for level detection and the strengthening furnace F using a voltage difference between the measurement bar 200 for level detection and the strengthening furnace F detected by the voltage measurement unit 204 for voltage difference detection and the constant current value measured in real time by the constant current supply unit 202. The voltage measurement unit 204 for voltage difference detection includes a second signal processing unit 209 that adjusts the voltage difference between the measurement bar 200 for level detection and the strengthening furnace F within an input voltage range of an input terminal provided in a second A/D converter 210, the second A/D converter 210 that converts an analog voltage output from the second signal processing unit 209 into digital data, and a voltage conversion unit 211 that converts the digital data converted by the second A/D converter 210 into a voltage.

Advantageous Effects

The potassium nitrate level detection sensing module in the strengthening furnace according to the present invention having such a configuration can automatically identify that potassium nitrate in a liquid state, which is melted in the strengthening furnace, has reached the set level line in the strengthening furnace.

In addition, the present invention can strengthen glass with an appropriate amount of potassium nitrate by automatically identifying that potassium nitrate in a liquid state melted in the strengthening furnace has reached the set level line in the strengthening furnace.

In addition, the present invention can reduce the time and waste of manpower consumed in adjusting the potassium nitrate level in the strengthening furnace and can automate the glass strengthening process.

In addition, the present invention is not restrained by inaccurate sensitivity of a conventional strengthening liquid level detection sensor and frequent errors of the strengthening liquid level detection sensor, and can automatically check that the strengthening liquid in the strengthening furnace has reached a set level without a person inevitably checking the level when checking the level of the strengthening liquid in the strengthening furnace.

In addition, the present invention can secure work stability and improve the mass productivity of strengthened glass by automating the level detection of the strengthening liquid in the strengthening furnace.

MODE FOR CARRYING OUT THE INVENTION

Hereinafter, the present invention will be described in detail with reference to the accompanying drawings.

Figure 1A:
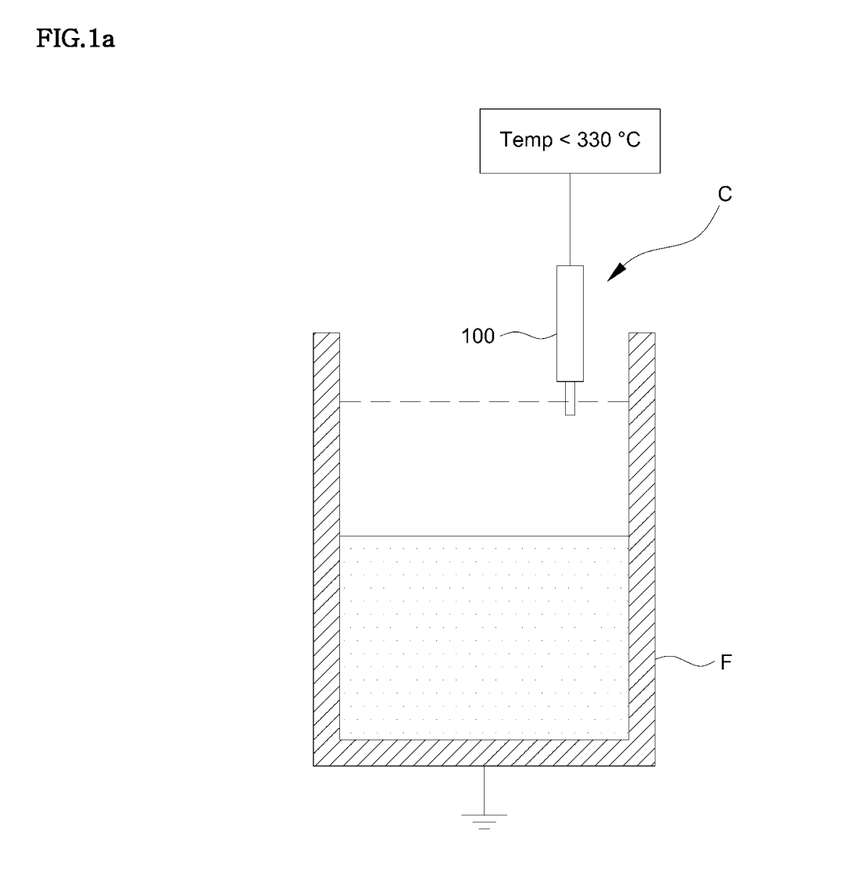
FIG. 1a is a diagram illustrating a temperature value measured through a temperature sensing module when strengthening liquid does not reach a set level line.
Figure 1B:
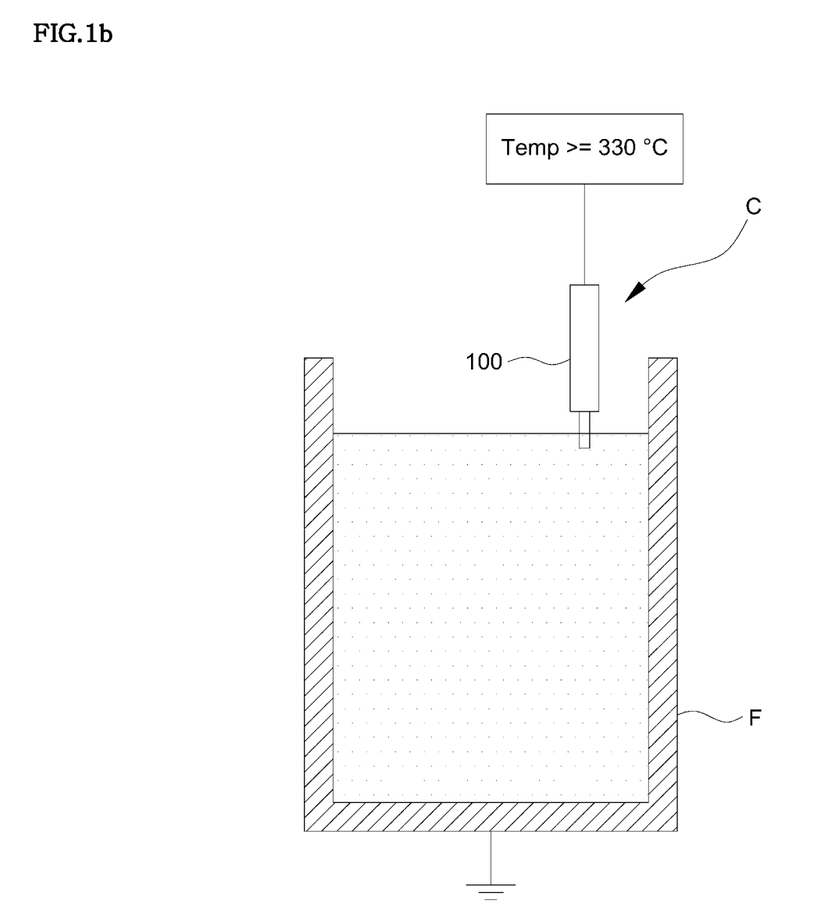
FIG. 1B is a diagram illustrating the temperature value measured through the temperature sensing module when the strengthening liquid reaches the set level line.

As in the first embodiment illustrated in FIGS. 1a and 1b, the potassium nitrate level detection sensing module M in the strengthening furnace according to the present invention includes a level detection means C, which is installed inside a glass strengthening furnace F, installed at a height equal to a level line of strengthening liquid to be filled in the strengthening furnace F, and generates an electrical signal having a set threshold or more or an electrical signal having the set threshold or less when it comes into contact with the strengthening liquid and detects that the strengthening liquid filled in the glass strengthening furnace F has reached a set strengthening liquid level line.

The level detection means C, as the first embodiment illustrated in FIGS. 1a and 1b, is a temperature sensing module 100 which is installed at a height equal to the level line of the strengthening liquid to be filled in the strengthening furnace F and detects the temperature, and the level detection sensing module M detects that the strengthening liquid filled in the strengthening furnace F has reached the set strengthening liquid level line if the temperature detected using the temperature sensing module 100 is 330 degrees or more.

Figure 2:
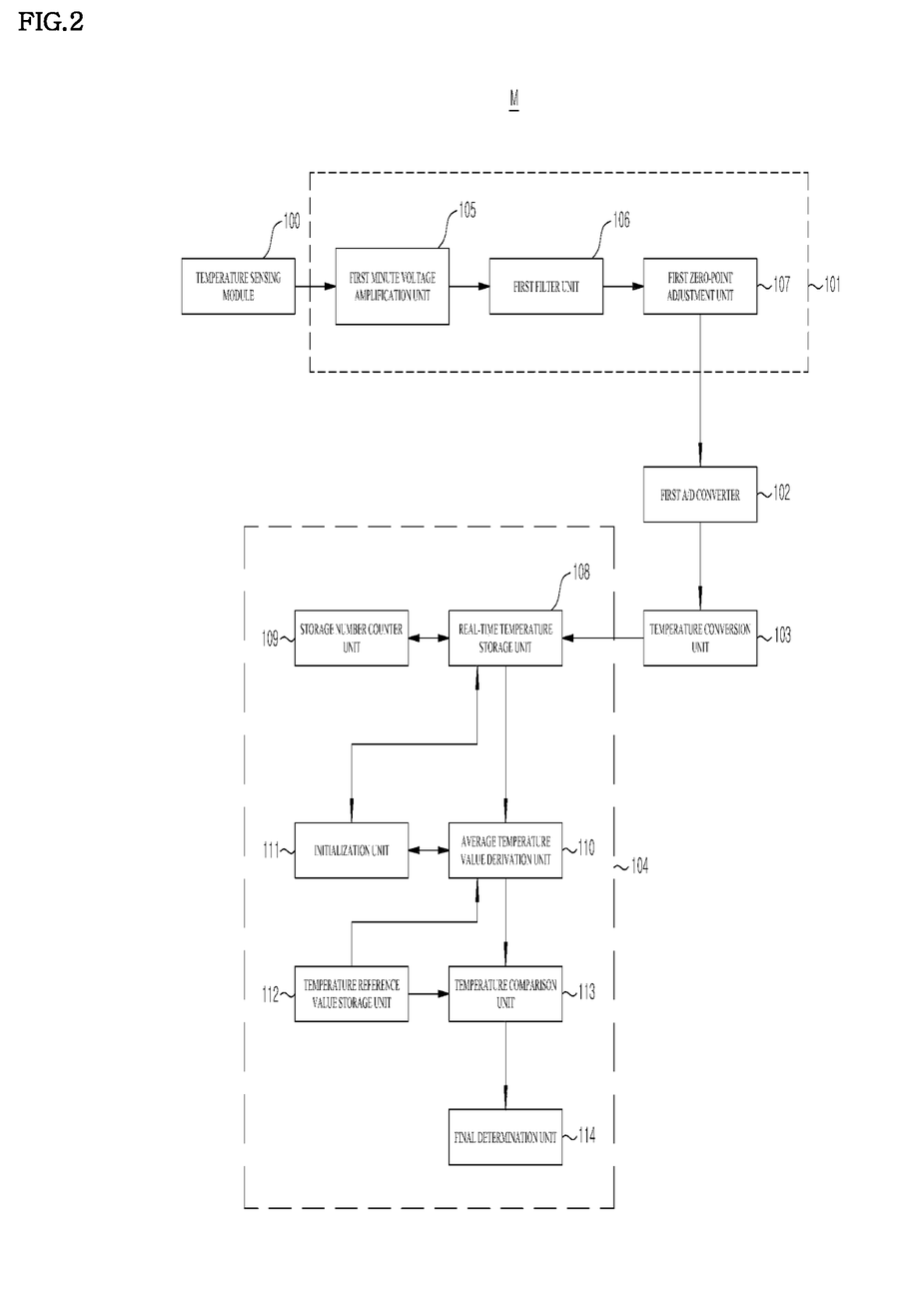
FIG. 2 is a control block diagram for a first embodiment of the present invention.

The level detection sensing module M, as the first embodiment illustrated in FIG. 2, further includes a first signal processing unit 101 that adjusts an output voltage range output from the temperature sensing module 100 within an input voltage range of an input terminal provided in a first A/D converter 102, the first A/D converter 102 that converts an analog voltage output from the first signal processing unit 101 into digital data, a temperature conversion unit 103 that converts the digital data output from the first A/D converter 102 into a temperature value of the strengthening liquid, and a level reaching determination unit 104 that determines that the strengthening liquid filled in the strengthening furnace F has reached the set strengthening liquid level line when a temperature value converted by the temperature conversion unit 103 is 330 degrees or more.

As illustrated in FIG. 2, the first signal processing unit 101 includes a first minute voltage amplification unit 105 that amplifies a minute voltage output from the temperature sensing module 100 by a predetermined gain, a first filter unit 106 that attenuates a noise level output from the first minute voltage amplification unit 105, and a first zero-point adjustment unit 107 that adjusts a DC offset voltage level of an analog voltage signal output from the first filter unit 106.

In the first filter unit 106, a 2-pole or more Butterworth low-pass filter is used.

As illustrated in FIG. 2, the level reaching determination unit 104 includes a real-time temperature storage unit 108 that sequentially stores 10 or more temperature values transmitted from the temperature conversion unit 103, a storage number counter unit 109 that counts the number of temperature values stored in the real-time temperature storage unit 108 in real time and stores the temperature values as many as the number set in the real-time temperature storage unit 108, an average temperature value derivation unit 110 that calculates an average temperature value for a set number of temperature values stored in the real-time temperature storage unit 108, an initialization unit 111 that initializes a plurality of temperature values stored in the real-time temperature storage unit 108 to initial values when the average temperature value calculation is completed by the average temperature value derivation unit 110, a temperature reference value storage unit 112 in which 330 degrees, which is a temperature reference value of the strengthening liquid, is stored, a temperature comparison unit 113 that compares the average temperature value calculated by the average temperature value derivation unit 110 with the temperature reference value of the strengthening liquid stored in the temperature reference value storage unit 112, and a final determination unit 114 that finally determines that the strengthening liquid in the strengthening furnace F has reached a set level when the average temperature value of the temperature comparator is equal to or greater than the temperature reference value of the strengthening liquid as a result of the comparison.

Figure 3A:
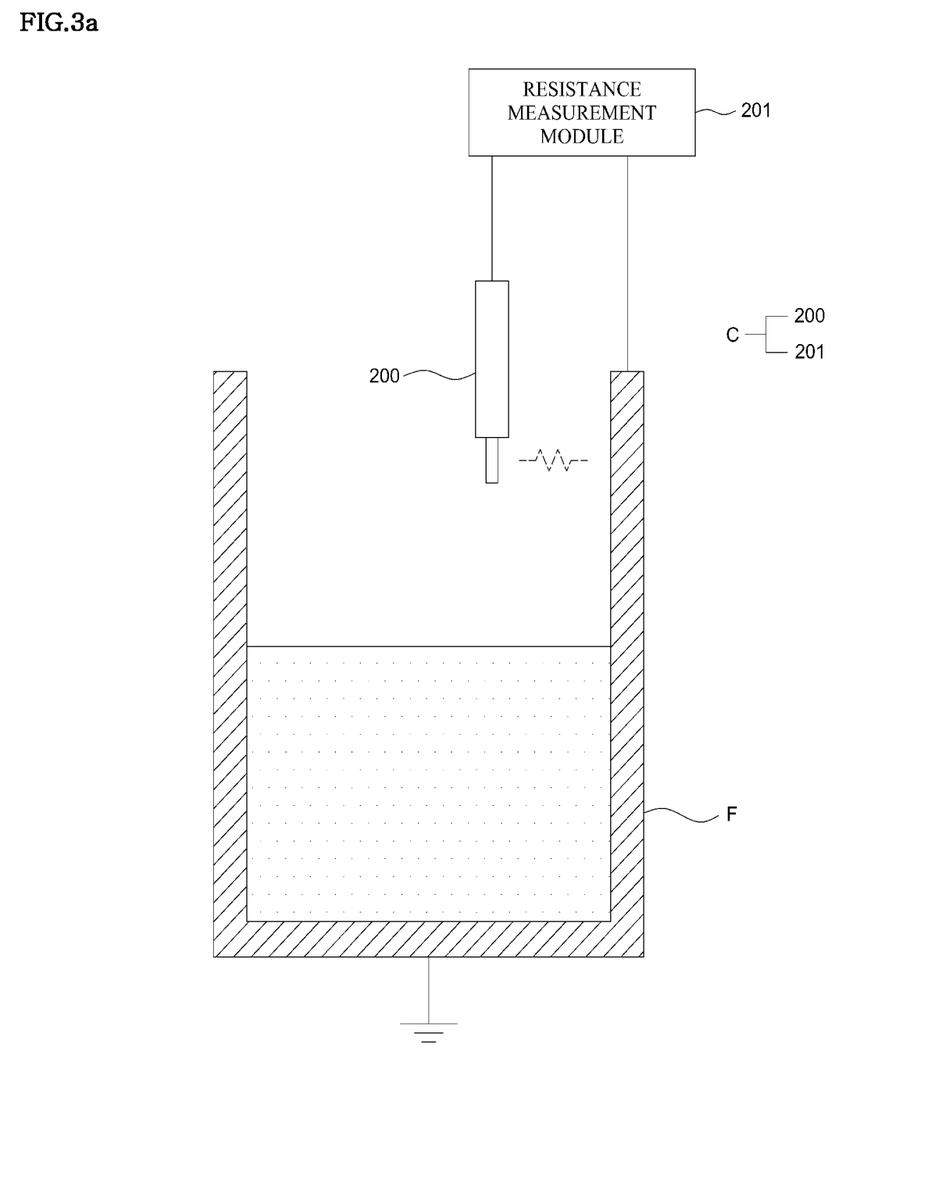
FIG. 3a is a conceptual diagram of a second embodiment of the present invention.

Meanwhile, as illustrated in FIG. 3a, the second embodiment of the present invention includes a level detection means C, which is installed inside a glass strengthening furnace F, installed at a height equal to a level line of strengthening liquid to be filled in the strengthening furnace F, and generates an electrical signal having a set threshold or more or an electrical signal having the set threshold or less when it comes into contact with the strengthening liquid and detects that the strengthening liquid filled in the glass strengthening furnace F has reached a set strengthening liquid level line.

The strengthening furnace F is a conductor, and the level detection means C, as in the second embodiment illustrated in FIG. 3A, includes the measurement bar 200 for level detection that is installed at a height equal to the level of the strengthening liquid to be filled in the strengthening furnace F and is made of a conductor, and the resistance measurement module 201 that measures a resistance value between the measurement bar 200 for level detection and the strengthening furnace F.

Figure 3B:
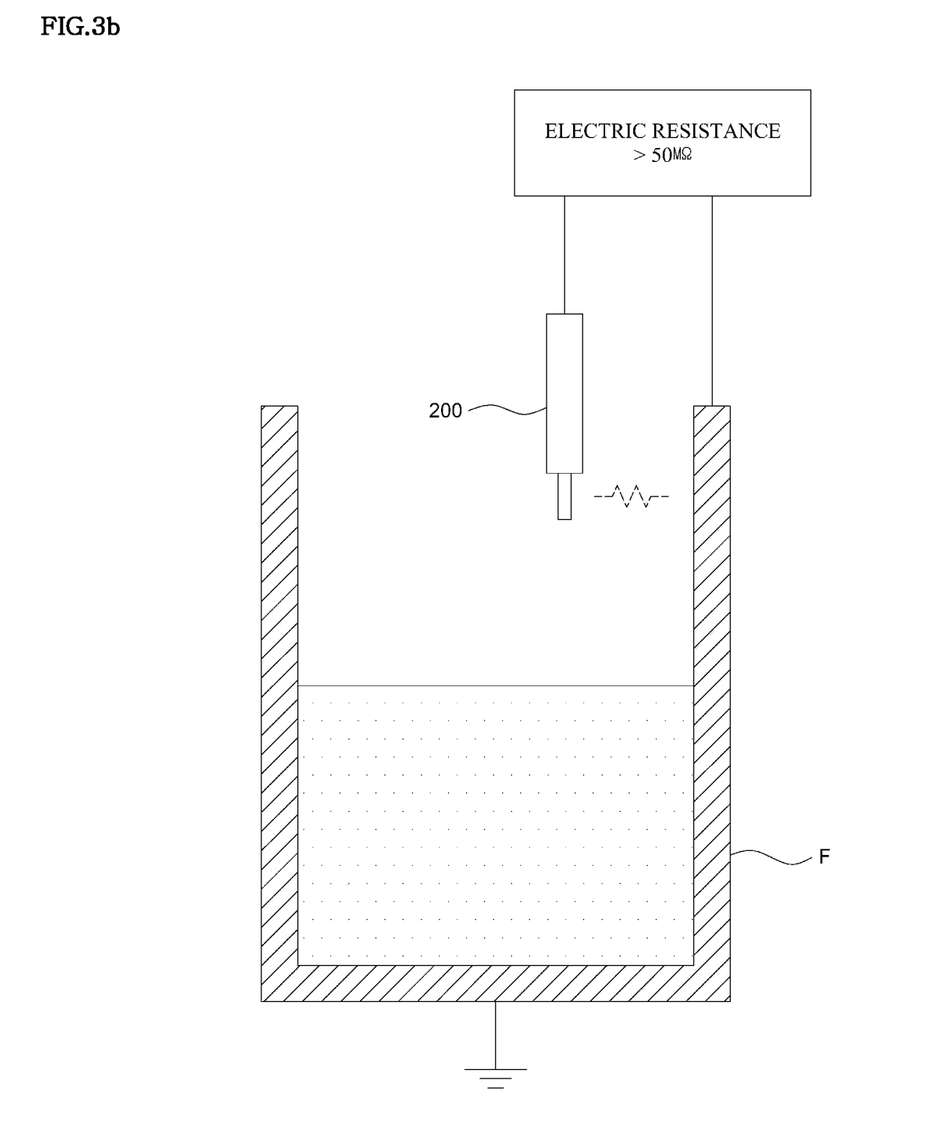
FIG. 3b is a diagram illustrating a resistance value between a measurement bar for level detection and a strengthening furnace when the strengthening liquid does not reach the set level line.
Figure 3C:
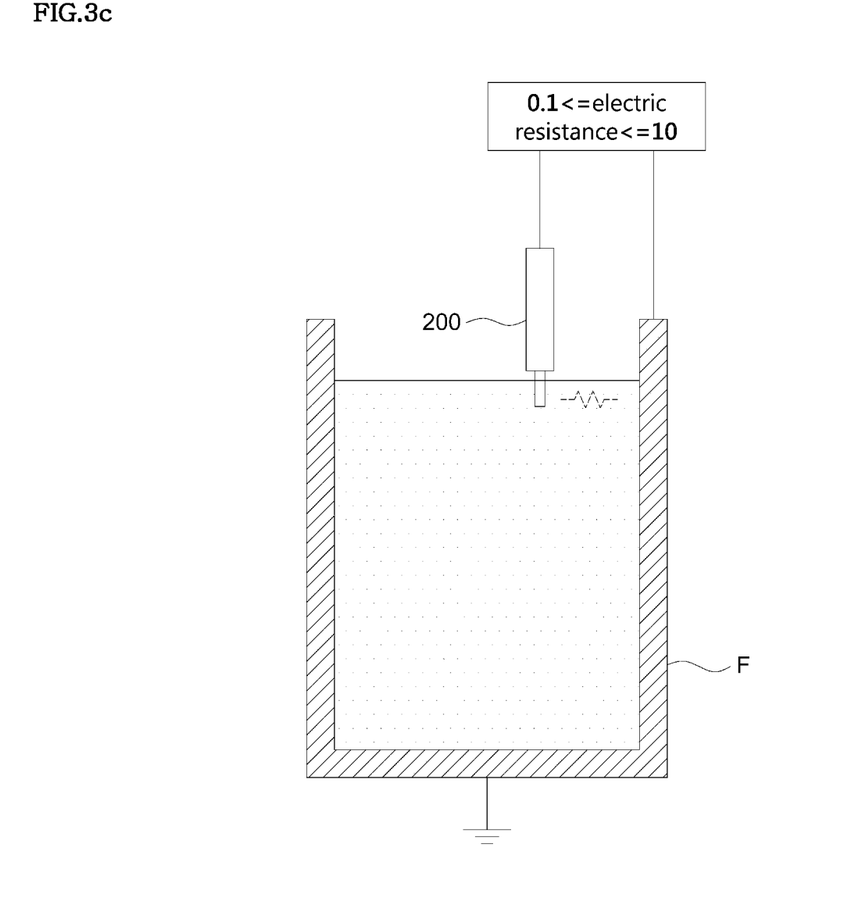
FIG. 3c is a diagram illustrating the resistance value between the measurement bar for level detection and the strengthening t furnace when the strengthening liquid reaches the set level line.

As in the second embodiment illustrated in FIGS. 3b and 3c, the level detection sensing module M determines that the strengthening liquid filled in the strengthening furnace F has reached the set strengthening liquid level line if the resistance value between the measurement bar 200 for level detection and the strengthening furnace F detected by the resistance measurement module 201 is within 0.1 ohm to 100 ohm.

Figure 4:
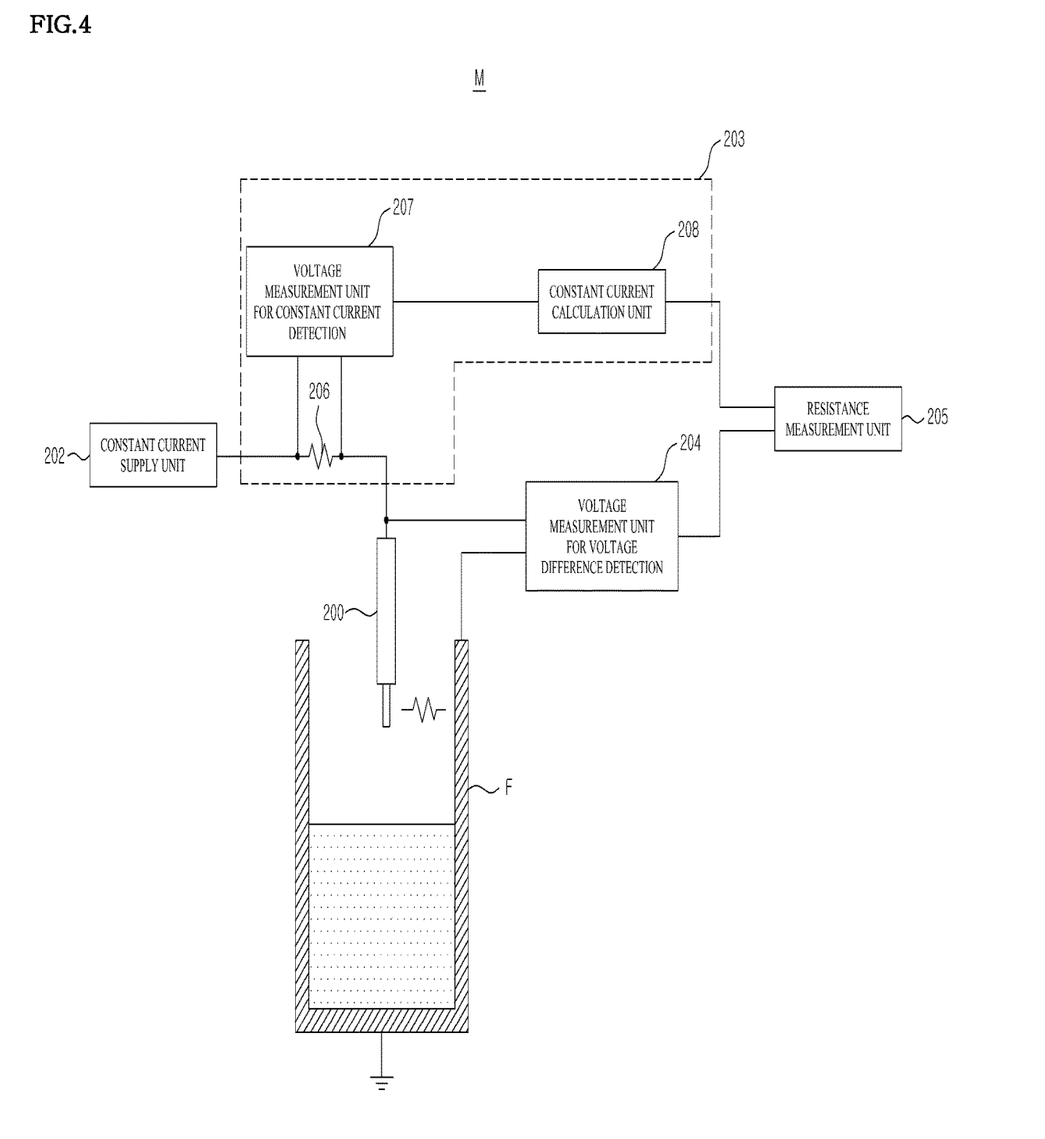
FIG. 4 is a control block diagram for the second embodiment of the present invention.

As illustrated in FIG. 4, the resistance measurement module 201 includes the constant current supply unit 202 that supplies a constant current to the measurement bar 200 for level detection, the constant current measurement unit 203 that measures a constant current value, which is input from the constant current supply unit 202 to the measurement bar 200 for level detection, in real time, the voltage measurement unit 204 for voltage difference detection that measures a voltage difference between the measurement bar 200 for level detection and the strengthening furnace F, and the resistance measurement unit 205 that measures resistance between the measurement bar 200 for level detection and the strengthening furnace F using a voltage difference between the measurement bar 200 for level detection and the strengthening furnace F detected by the voltage measurement unit 204 for voltage difference detection and the constant current value measured in real time by the constant current supply unit 202.

As illustrated in FIG. 4, the constant current measurement unit 203 includes a shunt resistor 206 for current measurement connected in series between the constant current supply unit 202 and the measurement bar 200 for level detection, a voltage measurement unit 207 for constant current detection that detects a voltage difference between both ends of the shunt resistor 206 for current measurement, and a constant current calculation unit 208 that calculates a constant current value using the voltage difference between both ends of the shunt resistor 206 for current measurement detected by the voltage measurer 207 for constant current detection and the value of the shunt resistor 206 for current measurement.

Figure 5:
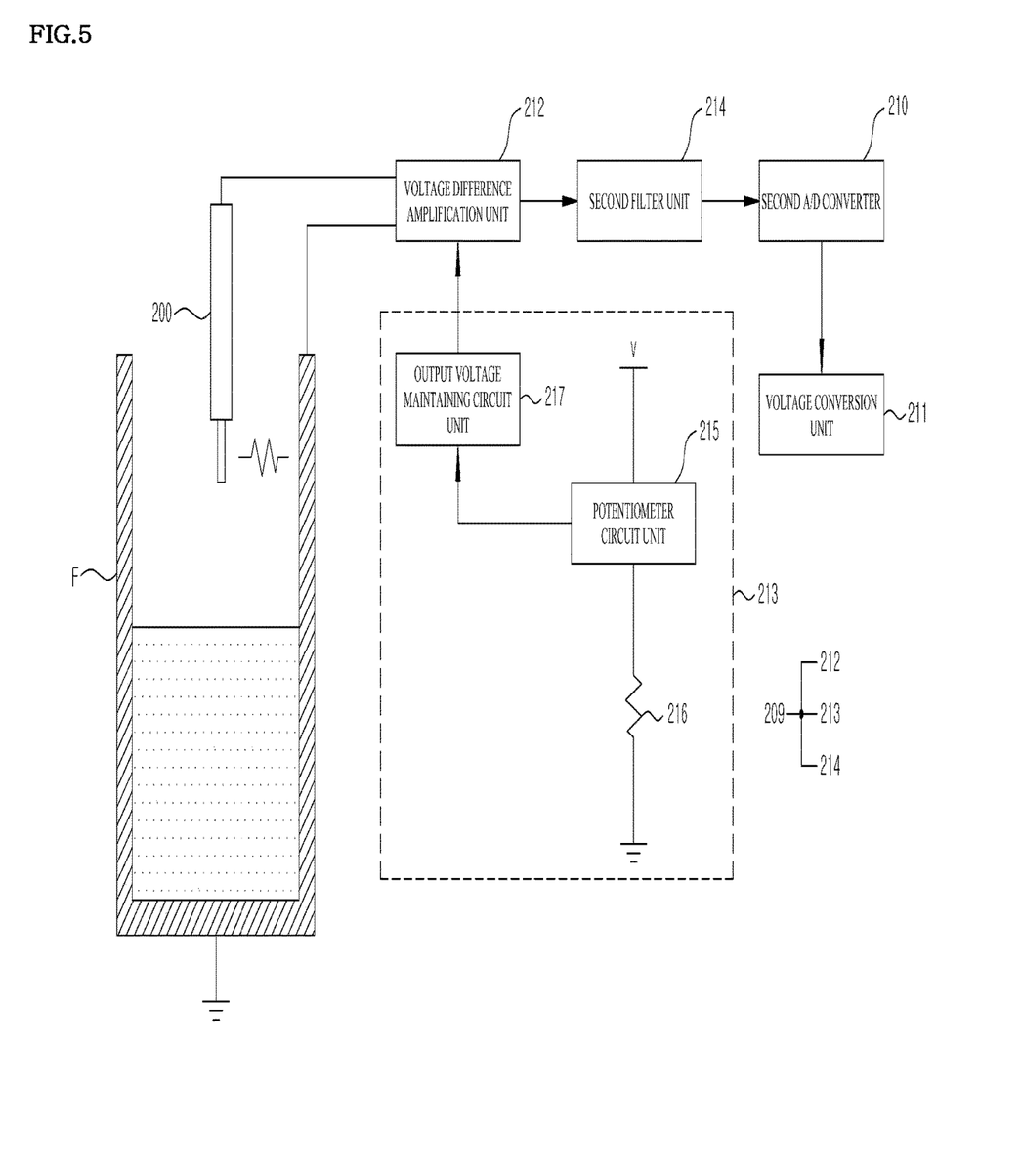
FIG. 5 is a diagram for describing components of a voltage measurement unit for voltage difference detection.

As in the first embodiment illustrated in FIG. 5, the voltage measurement unit 204 for voltage difference detection includes the second signal processing unit 209 that adjusts the voltage difference between the measurement bar 200 for level detection and the strengthening furnace F within an input voltage range of an input terminal provided in the second A/D converter 210, the second A/D converter 210 that converts an analog voltage output from the second signal processing unit 209 into digital data, and the voltage conversion unit 211 that converts the digital data converted by the second A/D converter 210 into a voltage.

As illustrated in FIG. 5, the second signal processing unit 209 includes a voltage difference amplification unit 212 that amplifies a minute voltage difference between the measurement bar 200 for level detection and the strengthening furnace F, a shift voltage circuit unit 213 that adjusts a DC offset voltage level of the voltage difference amplification unit 212, and a second filter unit 214 that attenuates a noise signal level output from the voltage difference amplification unit 212.

Figure 6:
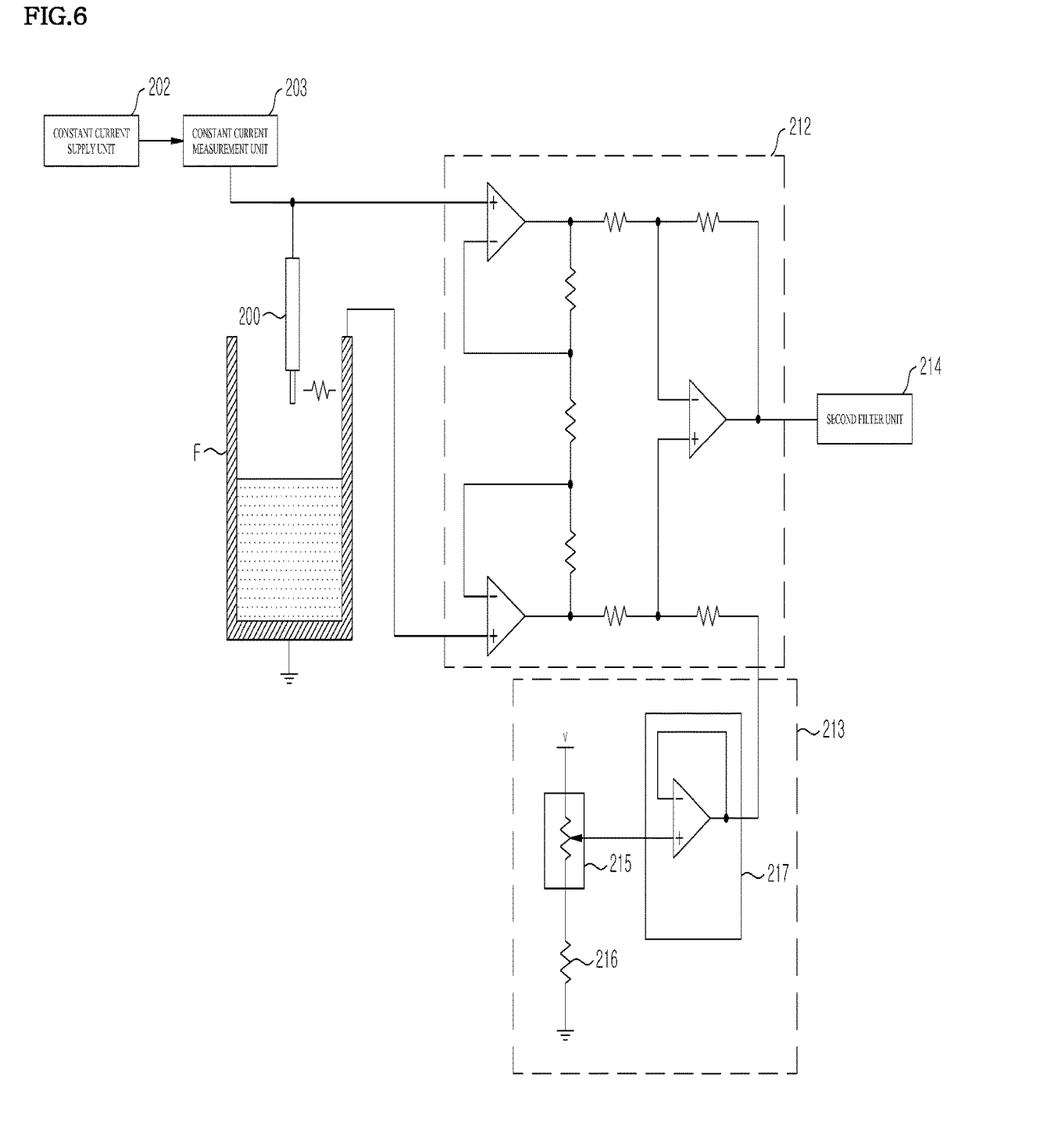
FIG. 6 is a diagram illustrating a voltage difference amplification unit and a shift voltage circuit unit.

As in the embodiment illustrated in FIGS. 5 and 6, the shift voltage circuit unit 213 includes a potentiometer circuit unit 215 that divides an input DC voltage in a predetermined ratio according to an internal resistance ratio and outputting the divided voltage, a first resistor 216 connected in series with the potentiometer circuit unit 215 and having one end grounded, and an output voltage maintaining circuit unit 217 that transfers an output voltage of the potentiometer circuit unit 215 to a DC offset voltage input terminal of the voltage difference amplification unit 212 without attenuation.

The shift voltage circuit part 213 can adjust the DC offset voltage level of the voltage difference amplification unit 212 by changing the internal resistance ratio of the potentiometer circuit unit 215.

In the second filter unit 106, a 2-pole or more Butterworth low-pass filter is used.

The potassium nitrate level detection sensing module in the strengthening furnace M according to the present invention having such a configuration can automatically identify that potassium nitrate in a liquid state, which is melted in the strengthening furnace F, has reached the set level line in the strengthening furnace F.

In addition, the present invention can strengthen glass with an appropriate amount of potassium nitrate by automatically identifying that potassium nitrate in a liquid state melted in the strengthening furnace F has reached the set level line in the strengthening furnace F.

In addition, the present invention can reduce the time and waste of manpower consumed in adjusting the potassium nitrate level in the strengthening furnace F and automate a glass strengthening process by automatically identifying that potassium nitrate in a liquid state melted in the strengthening furnace has reached the set level line in the strengthening furnace F.

The invention claimed is:

1. A potassium nitrate level detection sensing module M in a strengthening furnace, comprising:
a level detection means C, which is installed inside a glass strengthening furnace F, installed at a height equal to a level line of strengthening liquid to be filled in the strengthening furnace F, and generates an electrical signal having a set threshold or more or an electrical signal having the set threshold or less when the level detection means C comes into contact with the strengthening liquid and detects that the strengthening liquid filled in the glass strengthening furnace F has reached a set strengthening liquid level line, wherein the strengthening furnace F is a conductor,
the level detection means C includes
a measurement bar 200 for level detection that is installed at a height equal to the level of the strengthening liquid to be filled in the strengthening furnace F and is made of a conductor, and
a resistance measurement module 201 that measures a resistance value between the measurement bar 200 for level detection and the strengthening furnace F,
the resistance measurement module 201 includes
a constant current supply unit 202 that supplies a constant current to the measurement bar 200 for level detection,
a constant current measurement unit 203 that measures a constant current value, which is input from the constant current supply unit 202 to the measurement bar 200 for level detection, in real time,
a voltage measurement unit 204 for voltage difference detection that measures a voltage difference between the measurement bar 200 for level detection and the strengthening furnace F, and
a resistance measurement unit 205 that measures resistance between the measurement bar 200 for level detection and the strengthening furnace F using a voltage difference between the measurement bar 200 for level detection and the strengthening furnace F detected by the voltage measurement unit 204 for voltage difference detection and the constant current value measured in real time by the constant current measurement unit 203, and
the voltage measurement unit 204 for voltage difference detection includes
a second signal processing unit 209 that adjusts the voltage difference between the measurement bar 200 for level detection and the strengthening furnace F within an input voltage range of an input terminal provided in a second A/D converter 210,
the second A/D converter 210 that converts an analog voltage output from the second signal processing unit 209 into digital data, and
a voltage conversion unit 211 that converts the digital data converted by the second A/D converter 210 into a voltage.

2. The potassium nitrate level detection sensing module M in the strengthening furnace according to claim 1, wherein the level detection sensing module M determines that the strengthening liquid filled in the strengthening furnace F has reached the set strengthening liquid level line if the resistance value between the measurement bar 200 for level detection and the strengthening furnace F detected by the resistance measurement module 201 is within 0.1 ohm to 100 ohm.

\* \* \* \* \*